United States Patent Office 3,249,586
Patented May 3, 1966

3,249,586
ORGANOSILICON COMPOUNDS
Loren A. Haluska, Midland, Mich., assignor to Dow Corning Corporation, Midland, Mich., a corporation of Michigan
No Drawing. Filed June 1, 1964, Ser. No. 371,829
8 Claims. (Cl. 260—46.5)

This application relates to novel organosilicon compounds that are useful as sizing agents, elastomeric materials, etc.

The compounds of this invention include both silanes and siloxanes. The silanes of this invention can be described as being compounds of the formula

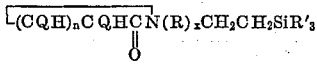

where $n$ is an integer of 2 through 3, and Q is selected from the group consisting of lower alkyl radicals and hydrogen atoms, R is a divalent radical, free of aliphatic unsaturation, selected from the group consisting of hydrocarbon radicals and radicals containing carbon atoms, hydrogen atoms, and oxygen atoms in an ether linkage, $x$ is an integer of 0 to 1, and R' is selected from the group consisting of monovalent hydrocarbon radicals, hydrolyzable groups, and the hydroxyl group.

Q can be hydrogen or any lower alkyl radical such as the methyl, ethyl, isopropyl, n-pentyl, or isohexyl radical.

R can be any divalent radical, as defined above, such as methylene, ethylene, propylene, decylene, octadecylene, 2,5-octylene,

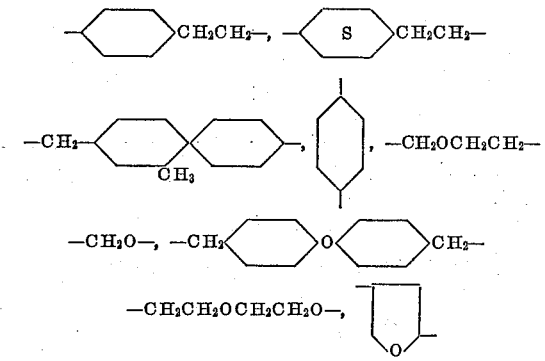

or

R' can be any monovalent hydrocarbon radical; e.g. alkyl groups such as methyl, ethyl, isopropyl, n-hexyl, 2-ethylhexyl and octadecyl; cycloaliphatic groups such as cyclohexyl and cyclopentenyl; unsaturated groups such as vinyl, ethynyl, allyl, 4-hexenyl, butadienyl, or 6-decenyl; and aromatic-containing groups such as phenyl, tolyl, benzyl, and naphthyl, R' can also be the hydroxyl group or any hydrolyzable groups known to the art; e.g., lower alkoxy groups such as methoxy, ethoxy, isopropoxy, butoxy, or isohexoxy; acyloxy groups such as formate, acetate, propionate or butyrate; ketoxime groups such as

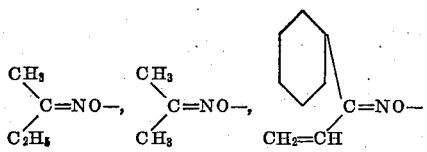

or

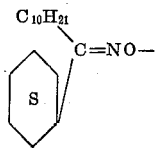

halogen groups: F, Cl, Br, or I; or the isocyanate group.

The siloxanes of this invention are siloxane polymers, containing at least one unit of the formula

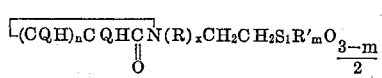

where $n$ is an integer of 2 through 3, Q is selected from the group consisting of lower alkyl radicals and hydrogen atoms, R is a divalent radical free of aliphatic unsaturation and selected from the group consisting of hydrocarbon radicals and radicals containing carbon atoms, hydrogen atoms, and oxygen atoms in an ether linkage, $x$ is an integer of 0 to 1, R' is selected from the group consisting of monovalent hydrocarbon radicals, hydrolyzable groups, and the hydroxyl group, and $m$ is an integer with a value of 0 through 2; any other units present being of the formula $Z_aSiO_{4-a/2}$, where Z is selected from the group consisting of monovalent hydrocarbon and halohydrocarbon radicals, and $a$ is an integer of 1 through 3.

Examples of Q, R, and R' are given above.

Z can be any monovalent hydrocarbon radical; e.g., alkyl radicals such as methyl, ethyl, isopropyl, n-hexyl, 2-ethylhexyl, and octadecyl; unsaturated radicals such as vinyl, ethynyl, allyl, butadienyl, or 5-hexenyl; cycloaliphatic radicals such as cyclohexyl or cyclopentenyl; and aromatic containing radicals such as phenyl, tolyl, benzyl, or naphthyl. Z can also be any monovalent halohydrocarbon radical; e.g., haloalkyl such as chloromethyl, 3,3,3-trifluoropropyl, β-(perfluoroheptyl)ethyl, or 4-bromohexyl; unsaturated radicals such as 3-chloroallyl or 4,4-difluorobutadienyl; cyclohaloaliphatic radicals such as chlorocyclohexyl or iodocyclopentenyl; and aromatic-containing radicals such as fluorophenyl, α,α,α-trifluorotolyl, or chlorobenzyl.

The silanes of this invention can be made by reacting

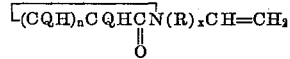

with HSiR'$_3$ in the presence of chloroplatinic acid, with a suitable solvent (e.g. xylene) and a vinyl polymerization inhibitor such as hydroquinone.

In other words, the reaction is:

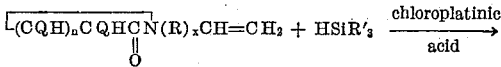

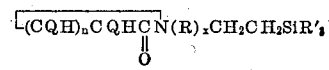

When $x$ is zero, a —CH$_2$CH$_2$— group connects the nitrogen and the silicon atom, i.e.:

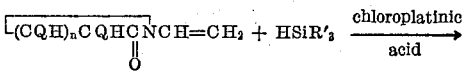

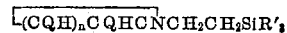

R can also represent a divalent hydrocarbon, hydrocarbon ether, or hydrocarbonoxy radical as is shown in the examples that follows:

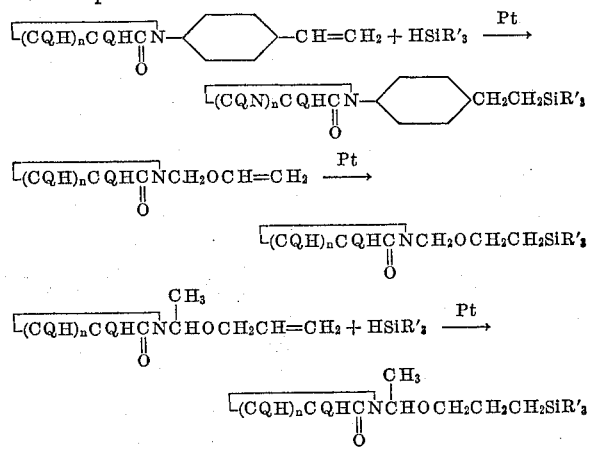

Elevated temperature accelerates the reaction, but temperature, pressure, and proportion of reactants all are not critical.

The siloxanes of this invention can be made by hydrolyzing and condensing silanes of this invention which contain hydrolyzable R′ groups. This hydrolysis reaction is well-known to the art.

A pure form of silane can be hydrolyzed to form siloxane homopolymers, or mixtures of silanes can be hydrolyzed to form siloxane copolymers. More than one species of silane of this invention can be cohydrolyzed, if desired, as can also other known silanes of the formula $Z_aSiR'_{4-a/2}$, where Z and a are defined above, and R′ is a hydrolyzable group, as defined above.

The siloxanes of this invention can also be made by reacting

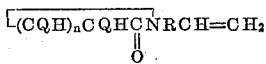

with a siloxane which contains silicon-bonded hydrogen. This type of reaction is illustrated by Examples 2 through 5.

The silanes of this invention are suitable as sizing agents and surfactants, while the siloxanes of this invention are useful thermoplastic, elastomeric, and resinous materials.

The following examples are illustrative only, and should not be construed as limiting the invention, which is properly delineated in the appended claims.

Example 1

Equimolar amounts of $(CH_3)HSi(OC_2H_5)_2$ and

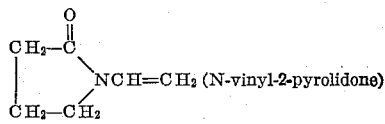

were heated at 101° to 126° C. in the presence of chloroplatinic acid and hydroquinone.

Distillation afforded a 17.0% yield of

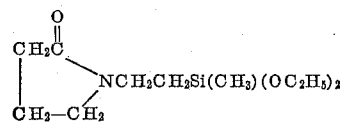

which has a boiling point of 130° C. at 0.6 mm. pressure, and a room temperature refractive index of 1.4538.

Hydrolysis of this product yielded a viscous, brown oil which was a homopolymer containing

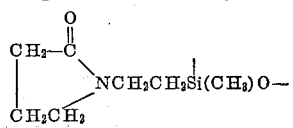

units.

Example 2

To 366.5 g. of N-vinyl-2-pyrrolidone was added 201.5 g. of tetramethyldisiloxane, 4 g. of hydroquinone, 0.014 g. of platinum (as $H_2PtCl_6$), and 431 g. of xylene.

This was heated at 92–132° C. for 109 hours. 20 g. of

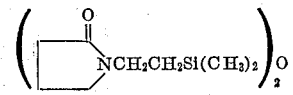

were recovered. The product has a boiling point of 150° C. at 0.8 mm. pressure, and a refractive index of 1.4640 at room temperature.

Example 3

To 203.6 g. of N-vinyl-2-pyrrolidone was added 385.9 g. of phenyltetramethyldisiloxane, 0.0084 g. of platinum (as $H_2PtCl_6$), and 2 g. of hydroquinone.

The mixture was heated at 150 to 210° C. for ten hours to yield 134 g. of

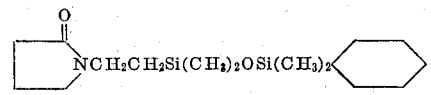

The product has a boiling point of 141° C. at 0.44 mm. pressure and a refractive index at room temperature of 1.4980.

Example 4

To 102.1 g. of N-vinyl-2-pyrrolidone was added 338.9 g. of n-octadecyltetramethyldisiloxane and 0.02 g. of platinum (as $H_2PtCl_6$).

The mixture was heated at 177° to 210° C. for 4 hours to recover 247.5 g. of

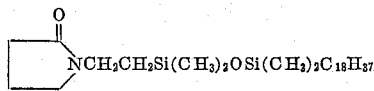

The product has a boiling point of 244.5° at 0.4 mm. pressure and a refractive index at room temperature of 1.4615.

Example 5

When N-vinyl-2-pyrrolidone is reacted with

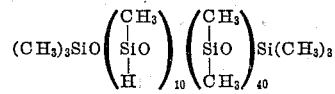

a siloxane of the formula

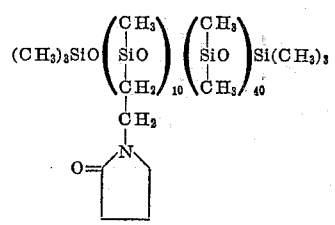

is formed.

Example 6

When the following pyrrolidones are reacted with the following silanes in the presence of platinum and hydroquinone, the following products are formed.

| | Pyrrolidone | Silane | Product |
|---|---|---|---|
| (a) | [pyrrolidone with N—(C₁₆H₃₂)CH=CH₂ and CH(CH₃)₂ substituent on ring] | HSiCl₂ [cyclohexyl] | [pyrrolidone with N—C₁₈H₃₆SiCl₂ and CH(CH₃)₂ substituent on ring, cyclohexyl on Si] |
| (b) | [pyrrolidone CH₃ substituent, NCH₂–(thiophene)–CH=CH₂] | HSi[ONC(CH₃)(C₂H₅)]₃ | [pyrrolidone with CH₃, NCH₂–(thiophene)–CH₂CH₂–Si[ONC(CH₃)—(C₂H₅)]₃] |
| (c) | C₂H₅ [piperidone-like ring] NCH₂–(CH₂–phenyl–phenyl–OCH=CH₂) | HSi(OCCH₃)₂ [thiophene, with O=C] | C₂H₅ [ring] NCH₂CH₂–(phenyl–phenyl)–OCH₂, CH₂Si(OCCH₃)₂ [thiophene] |
| (d) | [ring] NCH₂CH₂OCH₂CH=CH₂ | OH, HSiC₁₀H₂₁, CH=CH | [ring] NCH₂CH₂OCH₂CH₂CH₂SiC₁₀H₂₁, OH, CH=CH₂ |
| (e) | [ring] NCH₂–(phenyl–O–phenyl)–CH=CH₂, C₆H₁₃ | HSi(CH₃)₃ | [ring] NCH₂–(phenyl–O–phenyl)–CH₂, C₆H₁₃, CH₂Si(CH₃)₃ |
| (f) | [ring] NCH₂–(furan)–CH=CH₂ | HSi(C₂H₅)₃ | [ring] NCH₂–(furan)–CH₂CH₂Si(C₂H₅)₃ |

*Example 7*

When the following products of Example 6 are hydrolyzed and copolymerized with the following silanes, copolymeric compounds containing the following units are recovered:

| Product of Example | Silane(s) | Copolymer Units |
|---|---|---|
| 5a | (CH₃)₂Si(OCH₃)₂ | [pyrrolidone]NC₁₈H₃₆SiO—, (CH₃)₂SiO—, with CH(CH₃)₂ and thiophene substituents |
| 5b | CH₃Si(OCCH₃)₂ + (CH₂=CH)₂SiOCCH₃, C₁₈H₃₇ | CH₃ [pyrrolidone] NCH₂–(thiophene)–CH₂CH₂SiO₃/₂ + CH₃SiO—, +(CH₂=CH)₂—SiO₁/₂, C₁₈H₇₃ |

| Product of Example | Silane(s) | Copolymer Units |
|---|---|---|
| 5c | 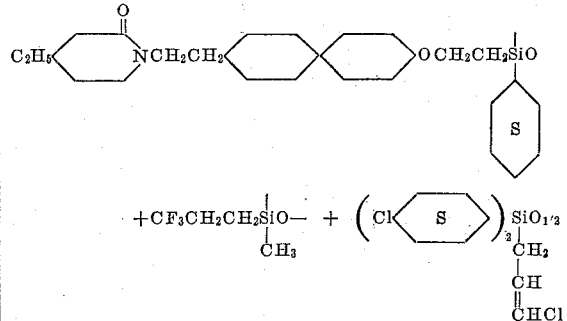 | |

That which is claimed is:
1. A compound of the formula

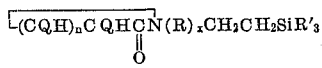

where $n$ is an integer of 2 through 3, Q is selected from the group consisting of lower alkyl radicals and hydrogen atoms, R is a divalent radical free of aliphatic unsaturation and selected from the group consisting of hydrocarbon radicals and radicals containing carbon atoms, hydrogen atoms, and oxygen atoms in an ether linkage, $x$ is an integer of 0 to 1, and R' is selected from the group consisting of monovalent hydrocarbon radicals, hydrolyzable groups, and the hydroxyl group.

2.

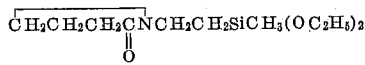

3. A siloxane polymer containing at least one unit of the formula

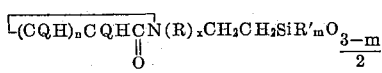

where $n$ is an integer of 2 through 3, Q is selected from the group consisting of lower alkyl radicals and hydrogen atoms, R is a divalent radical free of aliphatic unsaturation and selected from the group consisting of hydrocarbon radicals and radicals containing carbon atoms, hydrogen atoms, and oxygen atoms in an ether linkage, $x$ is an integer of 0 to 1, R' is selected from the group consisting of monovalent hydrocarbon radicals, hydrolyzable groups, and the hydroxyl group, and $m$ is an integer with a value of 0 through 2; any other units present being of the formula $Z_aSiO_{4-a/2}$ where Z is selected from the group consisting of monovalent hydrocarbon and halohydrocarbon radicals, and $a$ is an integer of 1 through 3.

4.

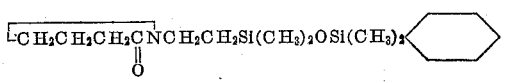

5.

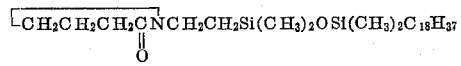

6. A homopolymer containing

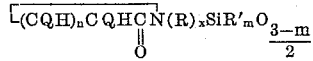

units where $n$ is an integer of 2 through 3, Q is selected from the group consisting of lower alkyl radicals and hydrogen atoms, R is a divalent radical free of aliphatic unsaturation and selected from the group consisting of hydrocarbon radicals and radicals containing carbon atoms, hydrogen atoms, and oxygen atoms in an ether linkage, $x$ is an integer of 0 to 1, R' is selected from the group consisting of monovalent hydrocarbon radicals, hydrolyzable groups, and the hydroxyl group, and $m$ is an integer with a value of 0 through 2.

7.

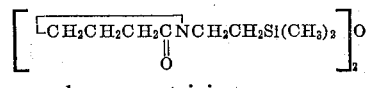

8. A homopolymer containing

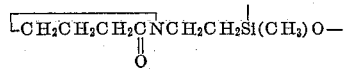

units.

References Cited by the Examiner
UNITED STATES PATENTS

| 2,845,435 | 7/1958 | Frisch et al. | 260—46.5 |
| 2,881,184 | 4/1959 | Pike | 260—46.5 |
| 2,902,468 | 9/1959 | Fianu | 260—46.5 |

FOREIGN PATENTS

| 1,115,927 | 10/1961 | Germany. |

LEON J. BERCOVITZ, *Primary Examiner.*
F. McKELVEY, *Assistant Examiner.*